(12) United States Patent
Choi et al.

(10) Patent No.: US 11,527,940 B2
(45) Date of Patent: Dec. 13, 2022

(54) MOTOR

(71) Applicant: LG INNOTEK CO., LTD., Seoul (KR)

(72) Inventors: Dae Ho Choi, Seoul (KR); Hong Shik Yun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 252 days.

(21) Appl. No.: 16/760,339

(22) PCT Filed: Nov. 2, 2018

(86) PCT No.: PCT/KR2018/013248
§ 371 (c)(1),
(2) Date: Apr. 29, 2020

(87) PCT Pub. No.: WO2019/088755
PCT Pub. Date: May 9, 2019

(65) Prior Publication Data
US 2021/0211020 A1    Jul. 8, 2021

(30) Foreign Application Priority Data
Nov. 2, 2017 (KR) .......... 10-2017-0145510
Nov. 2, 2017 (KR) .......... 10-2017-0145511

(51) Int. Cl.
*H02K 11/01* (2016.01)
*H02K 11/215* (2016.01)
(Continued)

(52) U.S. Cl.
CPC ......... *H02K 11/0141* (2020.08); *H02K 5/225* (2013.01); *H02K 11/215* (2016.01);
(Continued)

(58) Field of Classification Search
CPC .. H02K 11/0141; H02K 5/225; H02K 11/215; H02K 11/25; H02K 2203/09; H02K 2211/03; H02K 11/02; G01D 5/145
(Continued)

(56) References Cited

U.S. PATENT DOCUMENTS 4,214,360 A   7/1980  Tuma
5,005,283 A   4/1991  Deyo et al.
(Continued)

FOREIGN PATENT DOCUMENTS

DE    199 36 218 A1    2/2001
EP    3 109 599 A1    12/2016
(Continued)

OTHER PUBLICATIONS

Supplementary Partial European Search Report dated Nov. 9, 2020 in European Application No. 18872908.1.
(Continued)

*Primary Examiner* — Ahmed Elnakib
(74) *Attorney, Agent, or Firm* — Saliwanchik, Lloyd & Eisenschenk

(57) ABSTRACT

The present invention can provide a motor including a shaft, a rotor disposed outside the shaft, a stator disposed outside the rotor, a sensing magnet coupled to the rotor, a circuit substrate disposed above the sensing magnet and including a sensor configured to detect a magnetic flux change due to the sensing magnet, and a cap member which covers the sensor, wherein the circuit substrate includes a first substrate, a second substrate disposed to be spaced apart from the first substrate, and connecting portions connecting the first substrate to the second substrate, the sensor is mounted on the second substrate, and the cap member is disposed to pass through a separating space between the first substrate and the second substrate.

8 Claims, 14 Drawing Sheets

(51) Int. Cl.
*H02K 11/25* (2016.01)
*H02K 5/22* (2006.01)

(52) U.S. Cl.
CPC ......... *H02K 11/25* (2016.01); *H02K 2203/09* (2013.01); *H02K 2211/03* (2013.01)

(58) Field of Classification Search
USPC .......................................................... 310/66
See application file for complete search history.

(56) References Cited

U.S. PATENT DOCUMENTS

| 6,078,117 | A | 6/2000 | Perrin et al. | |
|---|---|---|---|---|
| 2011/0254388 | A1* | 10/2011 | Yamasaki | H02K 9/22 |
| | | | | 310/43 |
| 2015/0379897 | A1 | 12/2015 | Nadig et al. | |
| 2016/0013697 | A1 | 1/2016 | Haga et al. | |
| 2016/0178451 | A1 | 6/2016 | Kim et al. | |
| 2016/0336837 | A1 | 11/2016 | Ohnishi et al. | |
| 2017/0052038 | A1 | 2/2017 | Aichriedler et al. | |

FOREIGN PATENT DOCUMENTS

| FR | 2652227 | * | 3/1991 |
|---|---|---|---|
| JP | 7-274443 | A | 10/1995 |
| JP | 9-264795 | A | 10/1997 |
| JP | 9-312948 | A | 12/1997 |
| JP | 2010-178463 | A | 8/2010 |
| JP | 2011-229228 | A | 11/2011 |
| JP | 2012-168016 | A | 9/2012 |
| JP | 2017-34826 | A | 2/2017 |
| KR | 1999-0042651 | A | 6/1999 |
| WO | 2016/174704 | A1 | 11/2016 |

OTHER PUBLICATIONS

International Search Report in International Application No. PCT/KR2018/013248, filed Nov. 2, 2018.
Office Action dated Jun. 10, 2022 in Korean Application No. 10-2017-0145510.
Office Action dated Jul. 6, 2022 in Chinese Application No. 201880071689.3.
Office Action dated Aug. 30, 2022 in Japanese Application No. 2020-524381.

* cited by examiner

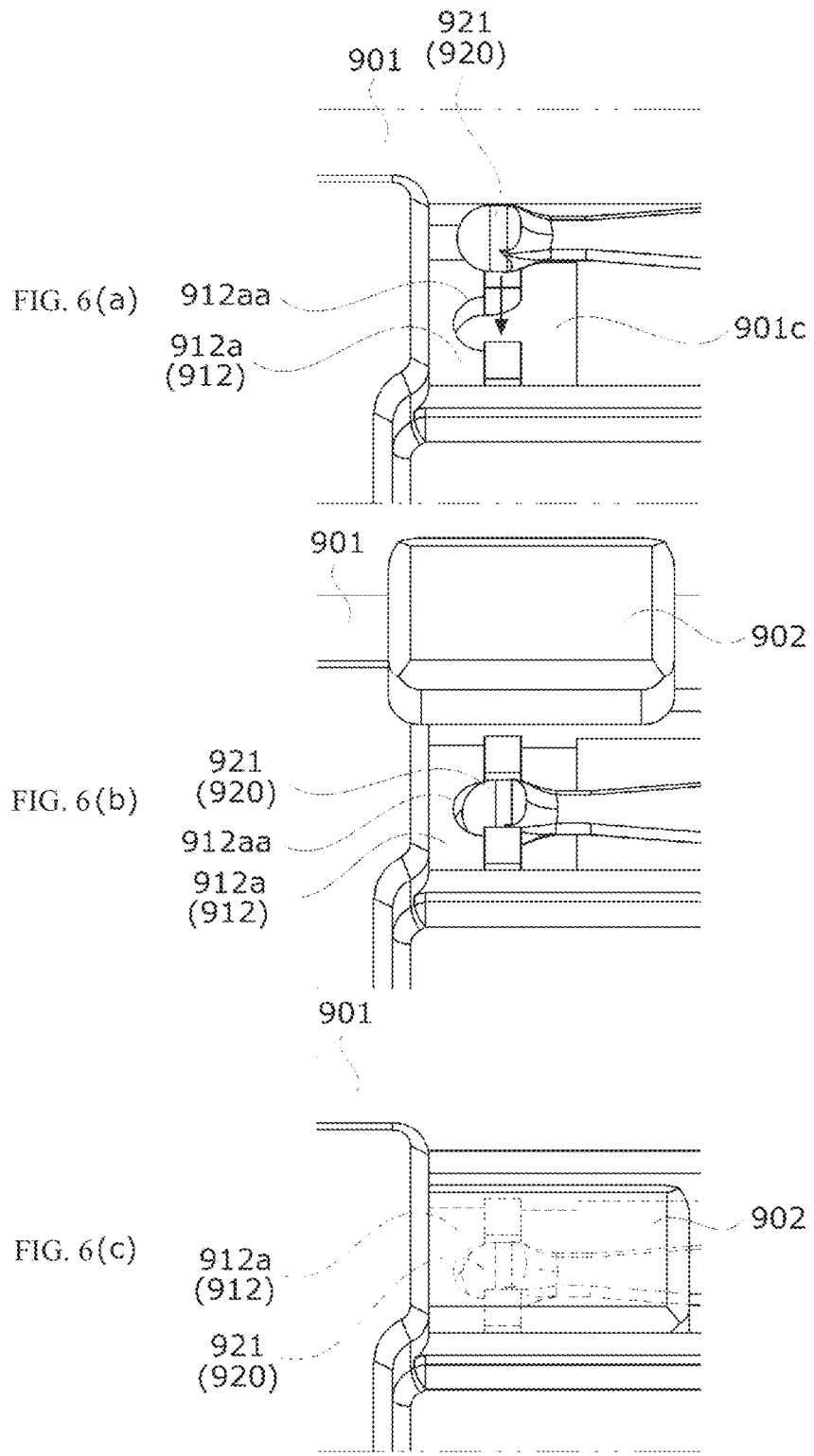

MOTOR

CROSS-REFERENCE TO RELATED APPLICATIONS

This application is the U.S. national stage application of International Patent Application No. PCT/KR2018/013248, filed Nov. 2, 2018, which claims the benefit under 35 U. S. C. § 119 of Korean Application Nos. 10-2017-0145510, filed Nov. 2, 2017; and 10-2017-0145511, filed Nov. 2, 2017, the disclosures of each of which are incorporated herein by reference in their entirety.

TECHNICAL FIELD

The present invention relates to a motor.

BACKGROUND ART

A motor includes a rotor and a stator. Coils are wound around the stator. The motor is required to be small in size but high in output power. However, in a case in which the output power of the motor is increased, there is a problem in that an internal temperature of the motor is increased. Accordingly, checking the internal temperature of the motor is a very important issue to secure performance of the motor.

In order to measure the internal temperature of the motor, one solution is a temperature sensor installed on the coil. However, such a solution has low adhesion between the temperature sensor and the coil, a problem occurs in that the temperature sensor is separated from the coil, and thus there is a big problem in that an error occurs in temperature measurement. In addition, there is another problem in that a process is complicated and difficult because an installation space for the temperature sensor is small.

The motor incudes a sensing magnet and a sensor which are components for detecting a position of the rotor. The sensing magnet is coupled to a shaft to operate in conjunction with the rotation of the shaft. In addition, the sensor is disposed to face the sensing magnet. The sensor detects a magnetic force of the sensing magnet.

Precisely detecting the position of the rotor is a very important factor to control the motor. However, the performance of detecting the position of the rotor may be significantly degraded due to electromagnetic waves or noise generated inside or outside the motor. In order to inhibit the performance degradation, a cap member configured to shield electromagnetic waves or noise is installed around the sensing magnet and the sensor. However, there are problems in that the number of components is increased because the cap member is installed, an assembly process becomes complicated because an installation process for the cap member is added, and it is difficult to secure the installation space for the cap member.

Technical Problem

The present invention is directed to providing a motor in which an error in temperature measurement of a temperature sensor is inhibited, and a fixing force of the temperature sensor is improved, and of which a process is simplified.

In addition, the present invention is directed to providing a motor in which a structure of a cap member is simplified, an assembly process of the cap member is simplified, and an installation space for the cap member is easily secured.

Objectives that should be solved according to embodiments are not limited to the above described objectives, and other objectives which are not described above will be clearly understood by those skilled in the art from the following specification.

Technical Solution

One aspect of the present invention provides a motor including a shaft, a rotor disposed outside the shaft, a stator disposed outside the rotor, a bus bar disposed on the stator, and a cover disposed on the bus bar, wherein the bus bar includes terminals connected to coils of the stator and an insulator which insulates the terminals from each other, and the cover includes a power source terminal portion coupled to the terminals, a temperature sensor connected to the power source terminal portion, and pad portions connected to the temperature sensor.

The motor may further include a front flange disposed between the bus bar and the cover.

The motor may further include a housing disposed outside the stator and the rotor, and a rear flange disposed at a lower side of the housing, wherein the front flange may be disposed at an upper side of the housing.

The temperature sensor may include a head portion and wires connected to the head portion, wherein the pad portions may include connecting ends connected to the wires.

The wires may include a first wire and a second wire, the pad portions may include a first pad portion and a second pad portion, the first wire may be connected to the first pad portion, and the second wire may be connected to the second pad portion.

The power source terminal portion may include a plurality of terminal ends, and a first terminal end of the plurality of terminal ends may be connected to the temperature sensor.

The front flange may include holes corresponding to positions of the terminal of the bus bar, and the terminals of the bus bar may be coupled to the plurality of terminal ends through the holes.

One end of the first terminal end of the power source terminal portion may be coupled to the terminal, and an installation groove in which the other end of the first terminal end is coupled to the head portion of the temperature sensor may be formed.

The installation groove corresponding to a shape of the head portion may be formed to be recessed in an end portion of the first terminal end.

The cover may include an accommodation portion disposed in a lower surface of the cover, and a wall protruding from the accommodation portion to be disposed between the wires.

The cover may include holes disposed in an upper surface of the cover, and parts of the pad portions may be exposed through the holes.

Another aspect of the present invention provides a motor including a shaft, a rotor disposed outside the shaft, a stator disposed outside the rotor, a sensing magnet coupled to the rotor, a circuit substrate disposed above the sensing magnet and including a sensor configured to detect a magnetic flux change due to the sensing magnet, and a cap member which covers the sensor, wherein the circuit substrate includes a first substrate, a second substrate disposed to be spaced apart from the first substrate, and connecting portions connecting the first substrate to the second substrate, the sensor is mounted on the second substrate, and the cap member is disposed to pass through a separating space between the first substrate and the second substrate.

The first substrate may include a through hole, and the second substrate may be disposed inside the through hole.

The motor may further include a fixing portion which fixes the cap member to the circuit substrate, wherein the fixing portion may include a body portion in contact with an upper surface of the cap member and leg portions disposed at both ends of the body portion and coupled to the circuit substrate.

The leg portions may be disposed to be bent from the body portion, and locking portions may be disposed at ends of the leg portions.

Slots formed upward from a lower end of the cap member may be disposed in the cap member, and the connecting portions may be disposed in the slots.

The first substrate may include grooves recessed from the through hole toward an inner side of the first substrate, and the leg portions may be disposed in the grooves.

The motor may further include a housing disposed on the rotor and the stator and a cover which covers on upper portion of the housing, the substrate may be disposed above the cover, and the cover may be coupled to the substrate.

A lower end of the cap member may be disposed at a higher level than the cover and disposed at a lower level than an upper end of the shaft.

Advantageous Effects

According to embodiments, an advantageous effect is provided in that a temperature sensor configured to measure an internal temperature of a motor has a high fixing force.

An advantageous effect is provided in that the temperature sensor is inhibited from being separated so that an error in temperature measurement is inhibited.

An advantageous effect is provided in that a process is simple.

An advantageous effect is provided in that an increase in the number of components or an increase in a manufacturing cost due to installation of the cap member is significantly reduced.

An advantageous effect is provided in that an assembly process of the cap member is simplified.

An advantageous effect is provided in that an installation space for the cap member is easily secured.

An advantageous effect is provided in that a size of the cap member is significantly decreased.

DESCRIPTION OF DRAWINGS

FIGS. 6(a)-6(c) are views illustrating a process of connecting a head portion of the temperature sensor to a connecting end of a terminal end.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both cases in which the two elements are formed or disposed in direct contact with each other and in which one or more other elements are interposed between the two elements. In addition, when one element is described as being disposed "on or under" another element, such a description may include a case in which the one element is disposed at an upper side or a lower side with respect to another element.

Figure 1:
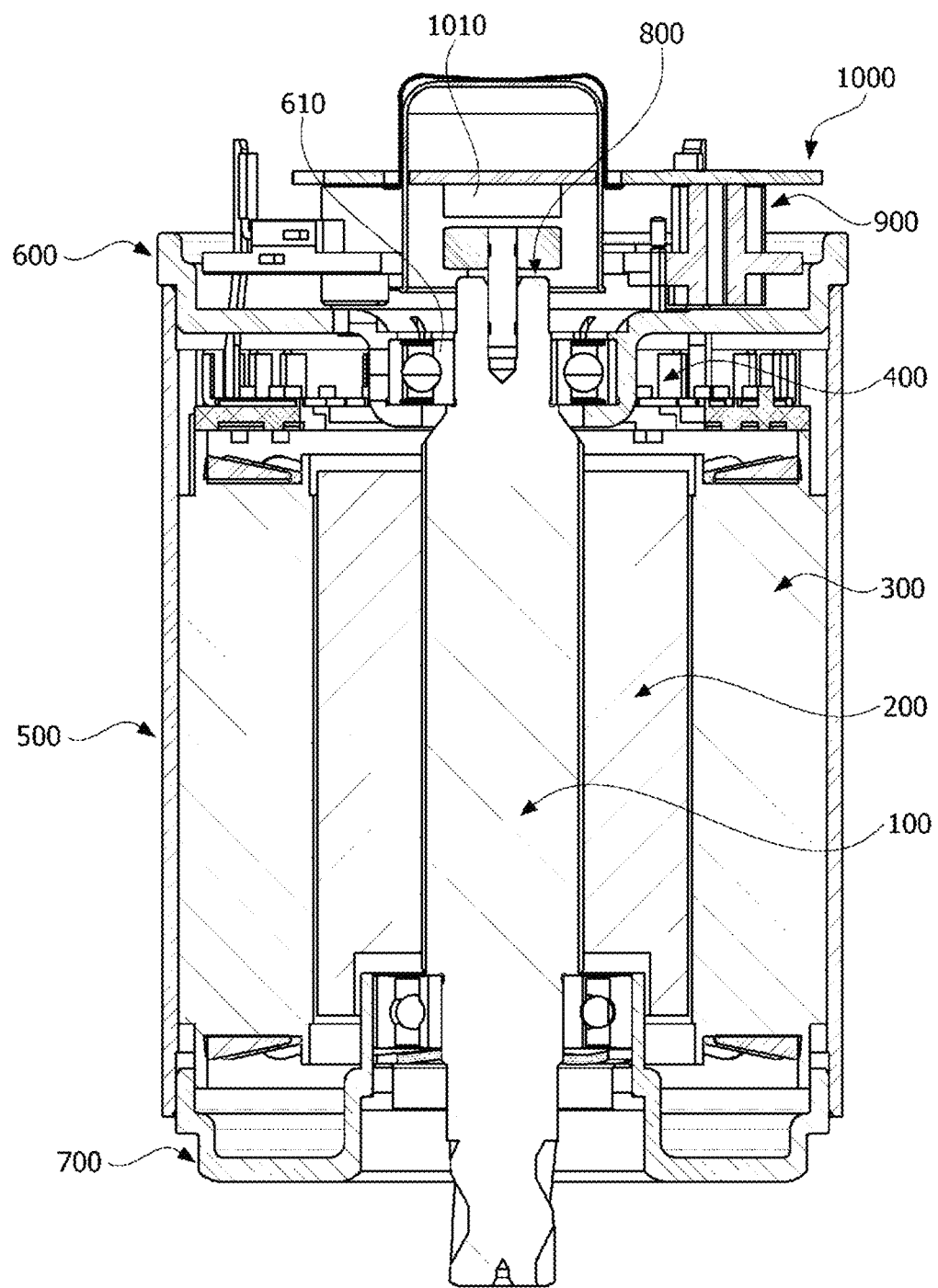
FIG. 1 is a cross-sectional view illustrating a motor according to an embodiment.
Figure 2:
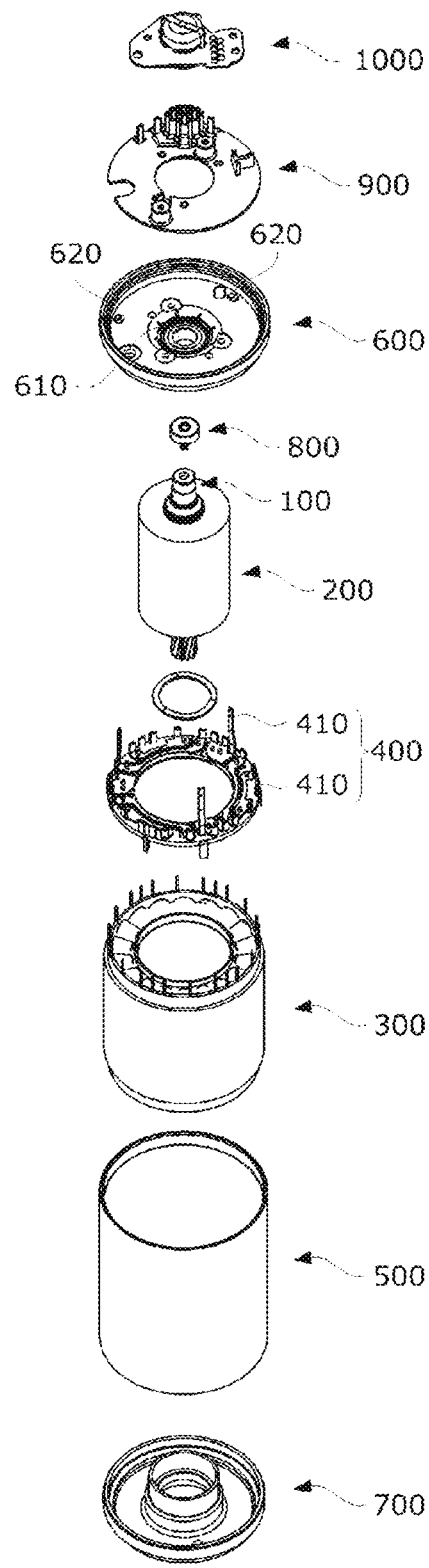
FIG. 2 is an exploded view illustrating the motor illustrated in FIG. 1.

FIG. 1 is a cross-sectional view illustrating a motor according to an embodiment, and FIG. 2 is an exploded view illustrating the motor illustrated in FIG. 1.

Referring to FIGS. 1 and 2, the motor according to the embodiment may include a shaft 100, a rotor 200, a stator 300, a bus bar 400, and a housing 500.

The shaft 100 may be coupled to the rotor 200. When a current is supplied and an electromagnetic interaction occurs between the rotor 200 and the stator 300, the rotor 200 is rotated and the shaft 100 is rotated in conjunction with the rotor 200.

The rotor 200 is rotated due to the electrical interaction with the stator 300.

The rotor 200 may include a rotor core and magnets. The rotor core may be formed such that a plurality of circular thin steel plates are stacked or may be formed to have a cylindrical shape. A hole into which the shaft 100 is inserted may be formed at a center of the rotor core. The magnets may be attached to an outer circumferential surface of the rotor core. The plurality of magnets may be disposed at predetermined intervals along a circumference of the rotor core. Alternatively, one ring type magnet may be attached to the rotor core.

Coils may be wound around the stator 300 to induce an electrical interaction with the rotor 200. A specific structure of the stator 300 to wind the coils will be described. The stator 300 may include a stator core including a plurality of teeth. A yoke portion having an annual shape and the teeth, around which the coils are wound toward a center of the stator core from the yoke portion, are provided to the stator core. The teeth may be provided at predetermined intervals along an outer circumferential surface of the yoke portion. Meanwhile, the stator core may be formed such that a plurality of thin steel plates are stacked on each other. In addition, the stator core may be formed such that a plurality of divided cores are coupled or connected to each other.

The bus bar 400 may be disposed on the stator 300. The bus bar 400 may include terminals 410 and a body 420 which insulates the terminals 410 from each other. The body 420 may have an annual shape. The terminals 410 may include phase terminals, which are connected to U-phase, V-phase, and W-phase power sources, and a neutral terminal electrically connecting the phase terminals.

The housing 500 may be disposed outside the rotor 200 and the stator 300. The housing 500 may be a cylindrical member of which an upper portion and a lower portion are open. A space accommodating the rotor 200 and the stator 300 is formed inside the housing 500.

A front flange 600 may be disposed on the stator 300. A bearing 610 may be disposed on a central portion of the front flange 600. In addition, holes 620 through which the terminals 410 pass may be disposed in the front flange 600. The front flange 600 is coupled to the upper portion of the housing 500 to cover the open upper portion of the housing 500.

The rear cover 700 may be disposed under the stator 300. A hole may be disposed in a central portion of the rear cover 700. The rear cover 700 is coupled to the lower portion of the housing 500 to cover the open lower portion of the housing 500.

A sensing magnet 800 may be coupled to an end of the rotating shaft 100. The sensing magnet 800 is a component configured to detect a position of the rotor 200.

A cover 900 may be disposed on the front flange 600. The cover 900 may be seated on the front flange 600. The cover 900 and the front flange 600 may be coupled to each other using a coupling structure extending from the cover 900 or an additional coupling member.

A sensor 1010 configured to detect a magnetic force of the sensing magnet 800 may be disposed on a circuit substrate 1000. In this case, the sensor 1010 may be a Hall integrated circuit (IC). The sensor 1010 detects changes of an N pole and an S pole of the sensing magnet 800 to generate a sensing signal.

Figure 3:
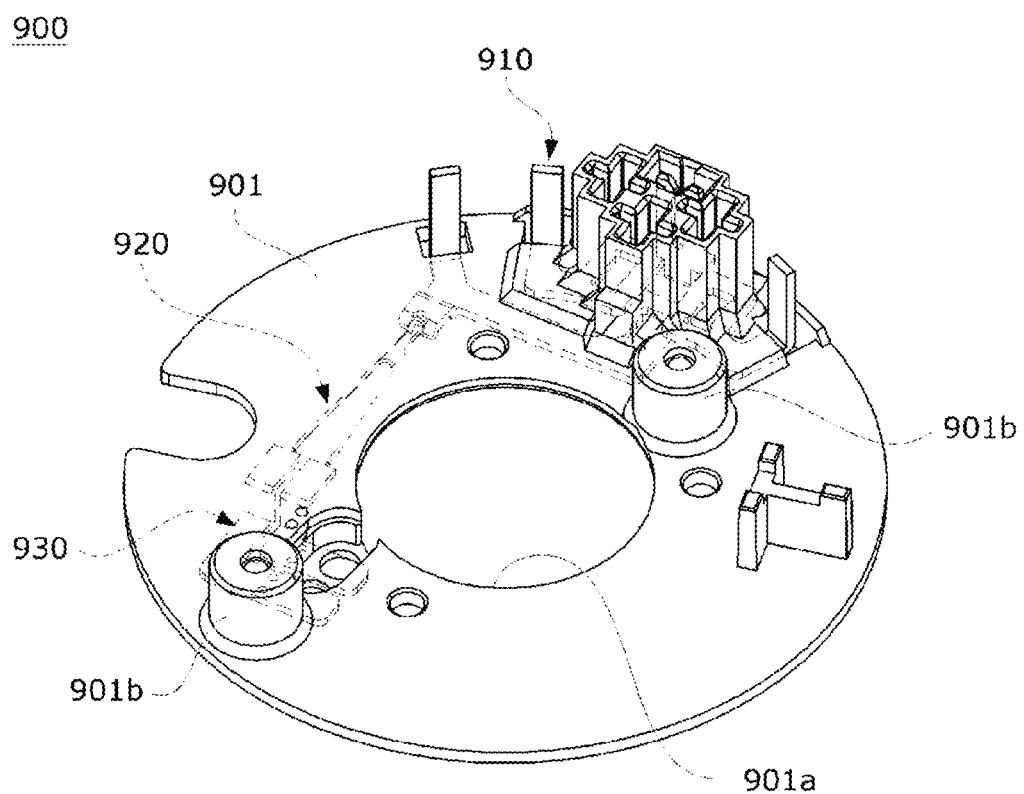
FIG. 3 is a view illustrating an upper surface of a cover.
Figure 4:
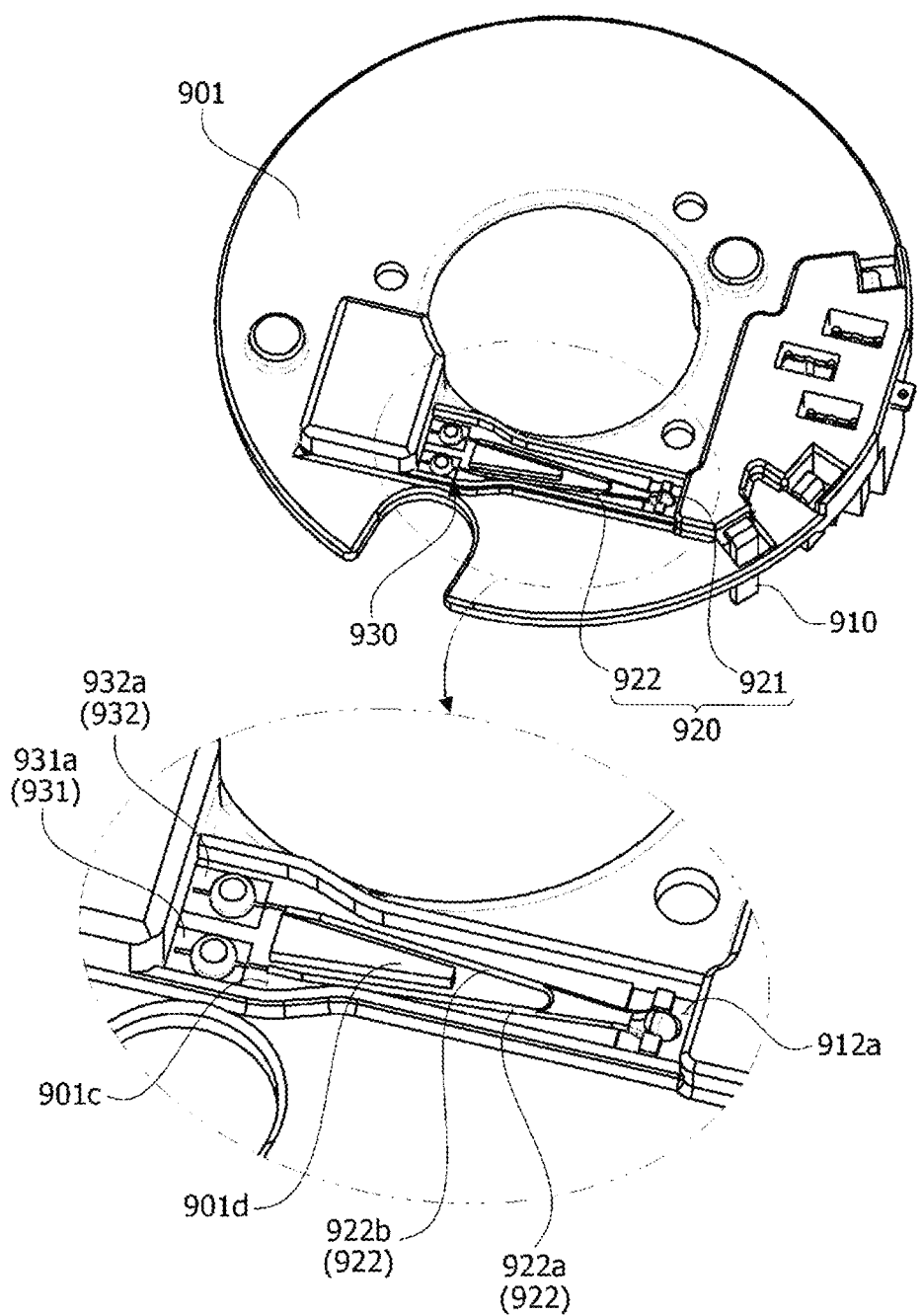
FIG. 4 is a view illustrating a lower surface of the cover.

FIG. 3 is a view illustrating an upper surface of the cover, and FIG. 4 is a view illustrating a lower surface of the cover.

Referring to FIGS. 3 and 4, the cover 900 may include a power source terminal portion 910, a temperature sensor 920, and pad portions 930.

The cover 900 may include a cover body 901. The cover body 901 may have a disc shape. A hole 901a may be disposed at a center of the cover body 901. In addition, a coupling boss 901b may protrude from an upper surface of the cover body 901. The coupling boss 901b is to be coupled to the circuit substrate 1000.

An external power source and the coils wound around the stator 300 are connected through the power source terminal portion 910.

Figure 5:
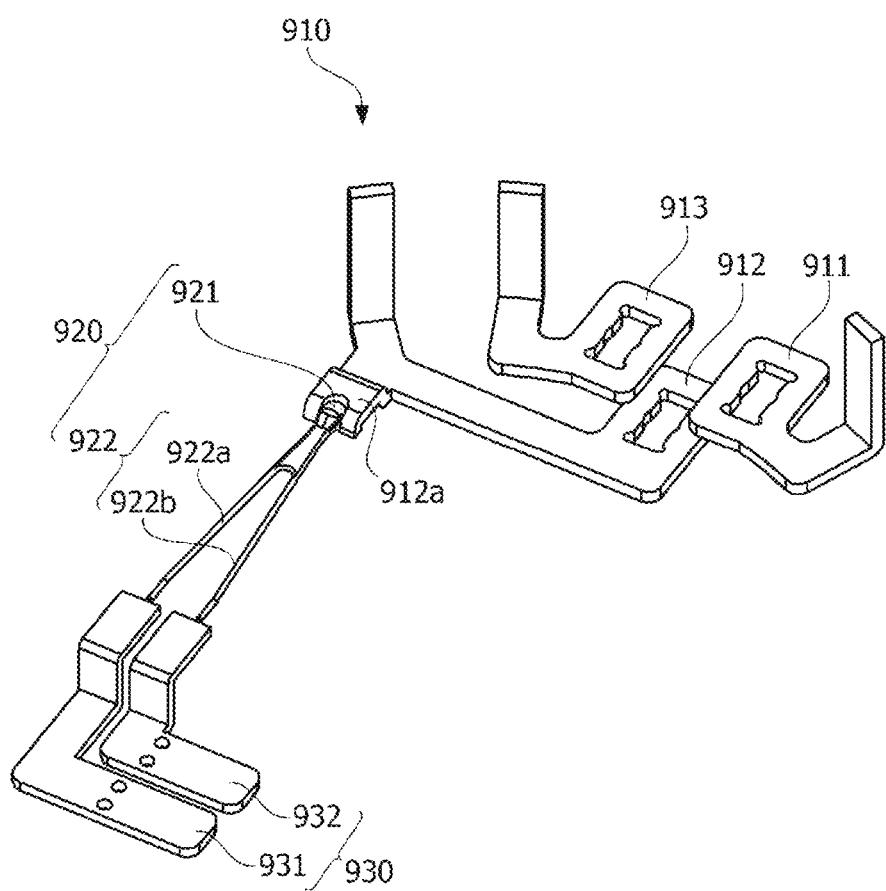
FIG. 5 is a view illustrating a power source terminal portion, a temperature sensor, and a pad portion.

FIG. 5 is a view illustrating the power source terminal portion, the temperature sensor, and the pad portion.

Referring to FIG. 5, the power source terminal portion 910 includes a plurality of terminal ends 911, 912, and 913. The terminal ends 911, 912, and 913 may be connected to the U-phase, V-phase, and W-phase power sources. A connecting end 912a may extend to be connected to a first terminal end 912 which is any one of the plurality of terminal ends 911, 912, and 913. The connecting end 912a is electrically connected to the temperature sensor 920.

The temperature sensor 920 may include a head portion 921 and wires 922. The head portion 921 may be an electric element of which a resistance value is changed according to a change in temperature. The head portion 921 may be formed of a composite of manganese, cobalt, nickel, and the like. The head portion 921 may have a circular round shape. The wires 922 are electrically connected to the head portion 921. The connecting end 912a is connected to the head portion 921. In addition, the wires 922 are connected to the pad portions 930. The wires 922 may include a first wire 922a and a second wire 922b.

The pad portions 930 are electrically connected to the wires 922. In addition, the pad portions 930 may be connected to an electric control unit of a vehicle. The pad portions 930 may include a first pad portion 931 and a second pad portion 932. The first pad portion 931 is connected to the first wire 922a. The second pad portion 932 is connected to the second wire 922b.

The power source terminal portion 910 is disposed to be spaced apart from the pad portions 930 on the cover body 901, and the temperature sensor 920 is connected to the power source terminal portion 910 and the pad portions 930. The terminal end, on which the connecting end 912a is disposed, among the plurality of terminal ends 911, 912, and 913 of the power source terminal portion 910 may be the first terminal end 912 disposed closest to the pad portion 930.

Referring to FIG. 4, an accommodation portion 901c accommodating the temperature sensor 920 may be disposed on a lower surface of the cover body 901. The connecting end 912a of the first terminal end 912 and connecting ends 931a and 932a of the pad portions 930 may be disposed to be exposed in the accommodation portion 901c. In addition, a wall 901d may be disposed to protrude from the accommodation portion 901c. The wall 901d is disposed between the first wire 922a and the second wire 922b to serve as a partition between an accommodation space for the first wire 922a and an accommodation space for the second wire 922b.

Heat generated by the coil of the stator 300 is transferred to the connecting end 912a of the power source terminal portion 910, and the heat transferred to the connecting end 912a is transferred to the head portion 921. When the heat is transferred to the head portion 921, a resistance value of the head portion 921 is changed, and the changed resistance value is transferred to the wires 922 and the pad portions 930 and transferred to the electric control unit of the vehicle through the pad portions 930. The electric control unit of the vehicle converts the changed resistance value of the head portion 921 to detect an internal temperature of the motor. Internal temperature data, which corresponds to the changed resistance value of the head portion 921, of the motor may be prestored in the electric control unit of the vehicle.

FIGS. 6(*a*)-6(*c*) are views illustrating a process of connecting the head portion of the temperature sensor to the connecting end of the terminal end.

As illustrated in FIG. 6A, the connecting end 912*a* of the first terminal end 912 is disposed to be exposed at the accommodation portion 901*c*. An installation groove 912*aa* having a round shape corresponding to a shape of the head portion 921 may be disposed in the connecting end 912*a* of the first terminal end 912. As illustrated in FIG. 6B, in a state in which the head portion 921 is installed in the installation groove 912*aa* and is connected to the connecting end 912*a*, an adhesive 902 may be applied thereon. As illustrated in FIG. 6C, when the adhesive 902 is cured, the head portion 921 of the temperature sensor 920 is fixed to the connecting end 912*a* of the first terminal end 912.

FIGS. 7(*a*)-7(*b*) are views illustrating a process of connecting the wire of the temperature sensor to the pad portion.

Figure 7A:
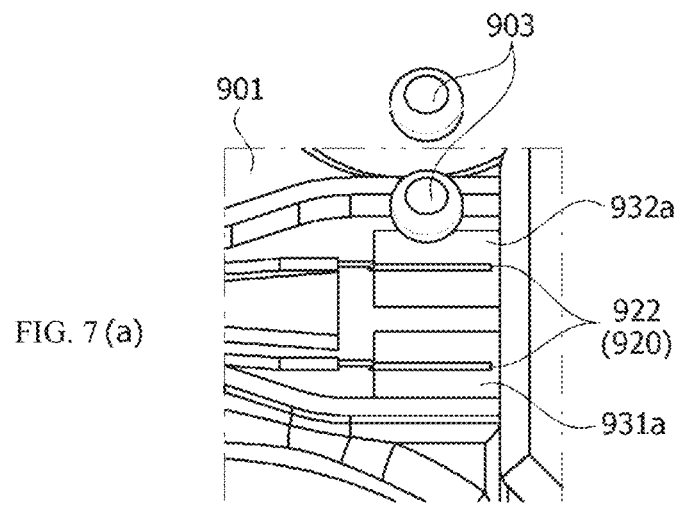
FIGS. 7(a)-7(b) are views illustrating a process of connecting a wire of the temperature sensor to the pad portion.
Figure 7B:
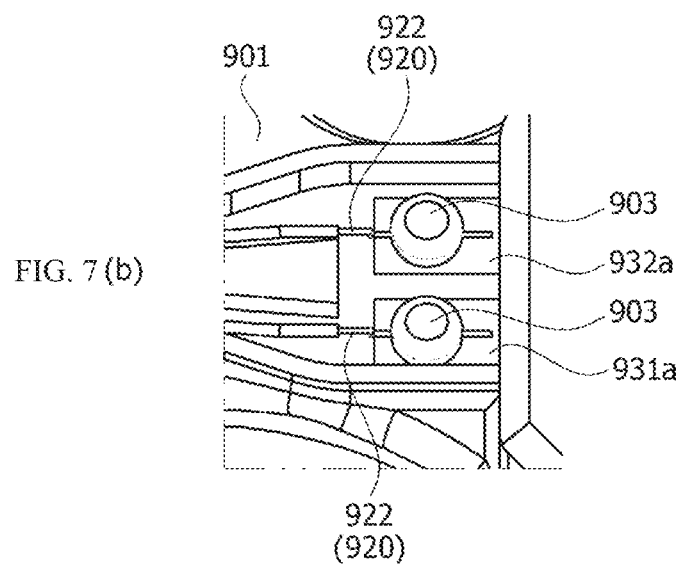

As illustrated in FIGS. 7A and 7B, the wires 922 are fixed to the connecting ends 931*a* and 932*a* of the pad portions 930 through solders 903.

Figure 8:
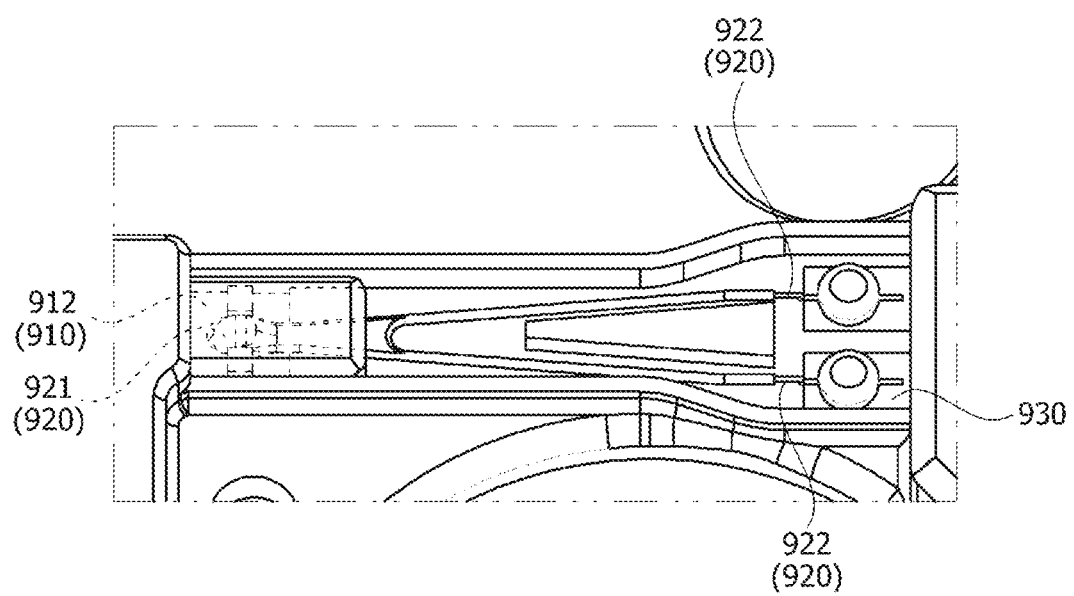
FIG. 8 is a view illustrating the temperature sensor connected to the power source terminal portion and the pad portion.

FIG. 8 is a view illustrating the temperature sensor connected to the power source terminal portion and the pad portion.

Referring to FIG. 8, the head portion 921 of the temperature sensor 920 is connected to the power source terminal portion 910. In addition, the wires 922 of the temperature sensor 920 are connected to the pad portions 930.

Figure 9:
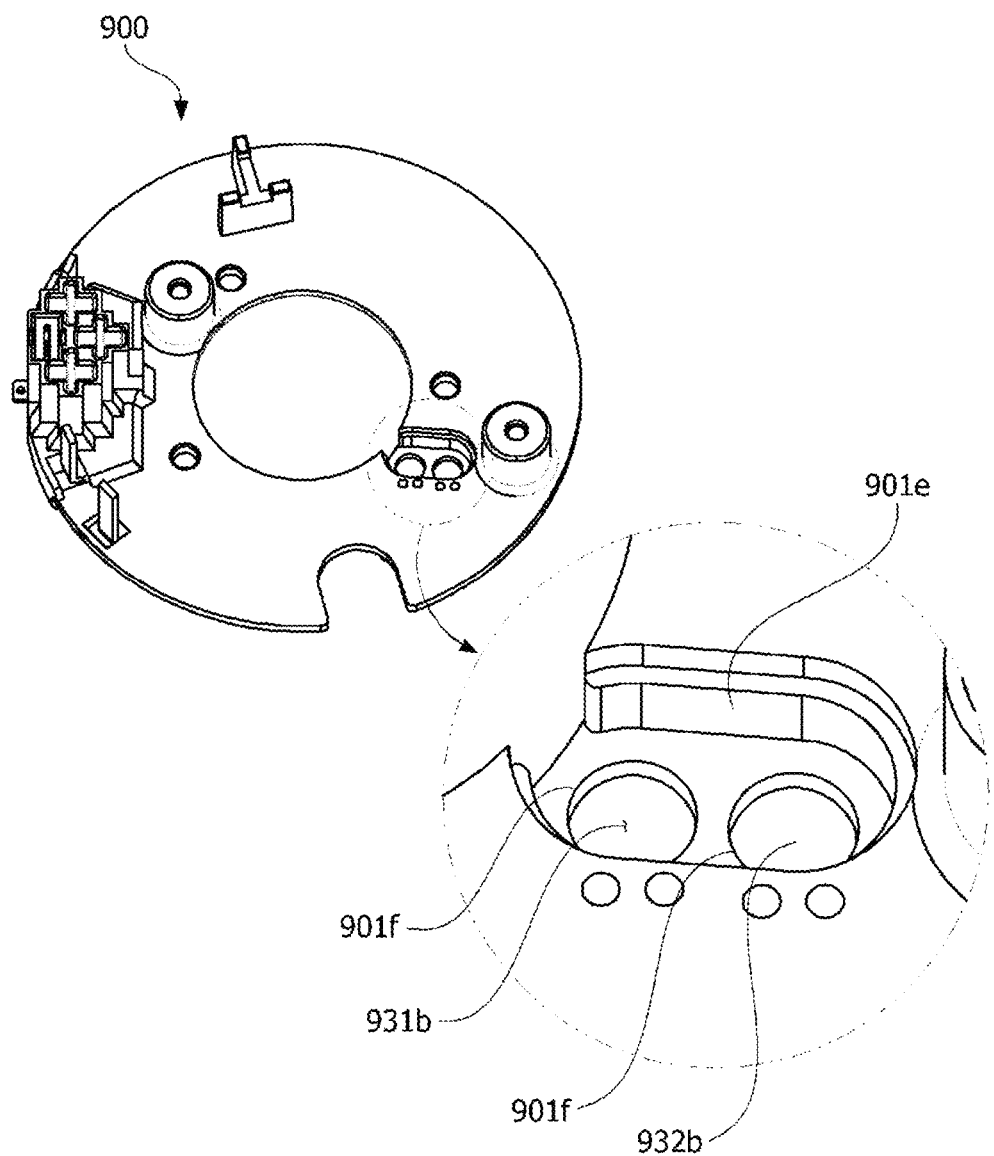
FIG. 9 is a view illustrating a connector of the pad portion.

FIG. 9 is a view illustrating a connector of the pad portion.

Referring to FIG. 9, a connector 901*e* by which connecting ends 931*b* and 932*b* of the pad portions 930 are exposed may be disposed on the upper surface of the cover body 901. The connector 901*e* is disposed to be recessed in the upper surface of the cover body 901. In addition, the connector 901*e* may include two holes 901*f* through which the connecting ends 931*b* and 932*b* of the pad portions 930 are exposed. An external connector connected to the electric control unit of the vehicle may be inserted into the connector 901*e*.

Figure 10:
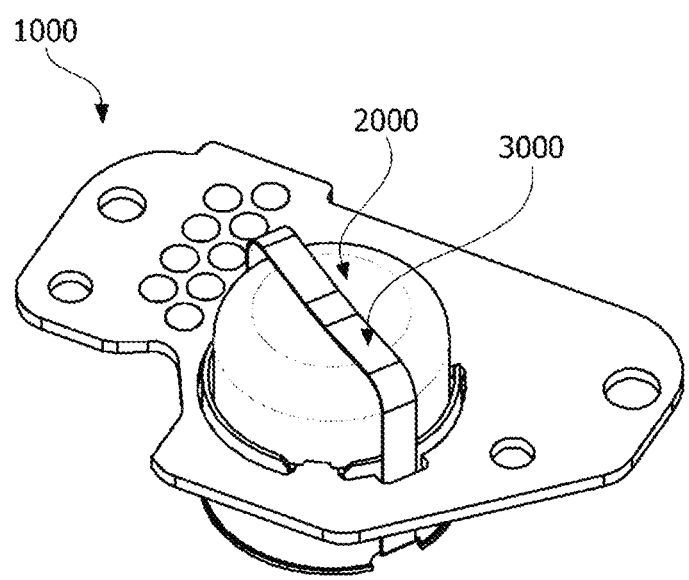
FIG. 10 is a view illustrating a circuit substrate, a cap member, and a fixing portion.

FIG. 10 is a view illustrating the circuit substrate, a cap member, and a fixing portion.

Referring to FIG. 10, a cap member 2000 is disposed to pass through the circuit substrate 1000, a fixing portion 3000 presses the cap member 2000 to fix the cap member 2000 to the circuit substrate 1000. An upper portion of the cap member 2000 has a form in which the cap member 2000 is disposed to protrude upward at a higher level than an upper surface of the circuit substrate 1000, and a lower portion of the cap member 2000 has a form in which the cap member 2000 is disposed to protrude downward at a lower level than a lower surface of the circuit substrate 1000.

Figure 11:
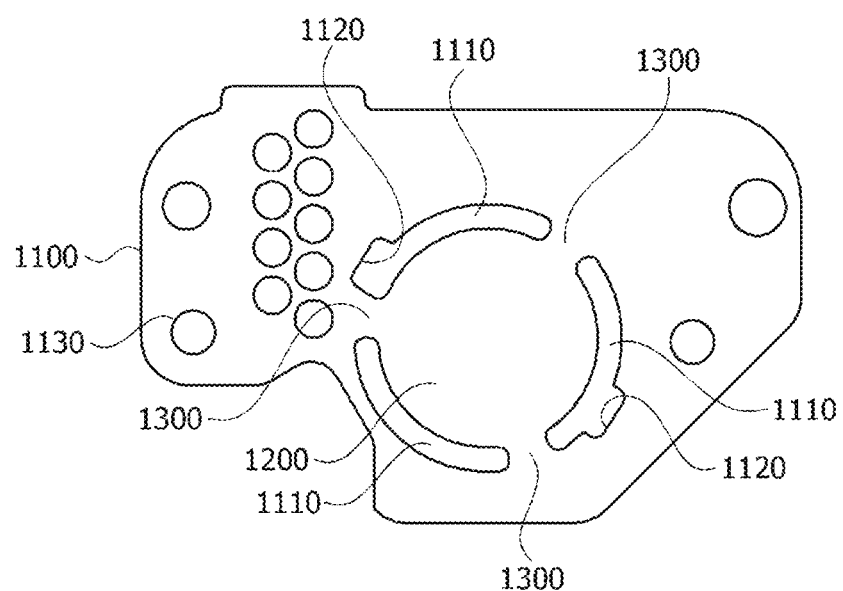
FIG. 11 is a view illustrating the circuit substrate.

FIG. 11 is a view illustrating the circuit substrate.

Referring to FIG. 11, the circuit substrate 1000 may include a first substrate 1100, a second substrate 1200, and connecting portions 1300. The first substrate 1100 includes through holes 1110. The second substrate 1200 is disposed inside the through holes 1110. The second substrate 1200 may have a disc shape. The first substrate 1100 and the second substrate 1200 are disposed to be spaced apart from each other and connected through the connecting portions 1300. The plurality of connecting portions 1300 may be provided. The connecting portions 1300 may be disposed at predetermined intervals along the through holes 1110. An overall form of the circuit substrate 1000 is that the second substrate 1200 is disposed inside the through holes 1110 and the first substrate 1100 is disposed outside the through holes 1110.

The first substrate 1100 may include grooves 1120. The grooves 1120 are disposed to be recessed from the through holes 1110 toward the first substrate 1100. The fixing portion 3000 is inserted into the grooves 1120. The number of grooves 1120 may be two, and the two grooves 1120 may be symmetrically disposed with respect to a center of the second substrate 1200.

The first substrate 1100 may be coupled to the cover 900. To this end, the first substrate 1100 may include a coupling hole 1130. The coupling hole 1130 may be provided as a plurality of coupling holes. The coupling hole 1130 has a coupling structure extending from the cover 900 or is a hole to which an additional coupling member is coupled. The coupling hole 1130 may be aligned with the coupling boss 901*b* of the cover 900.

Figure 12:
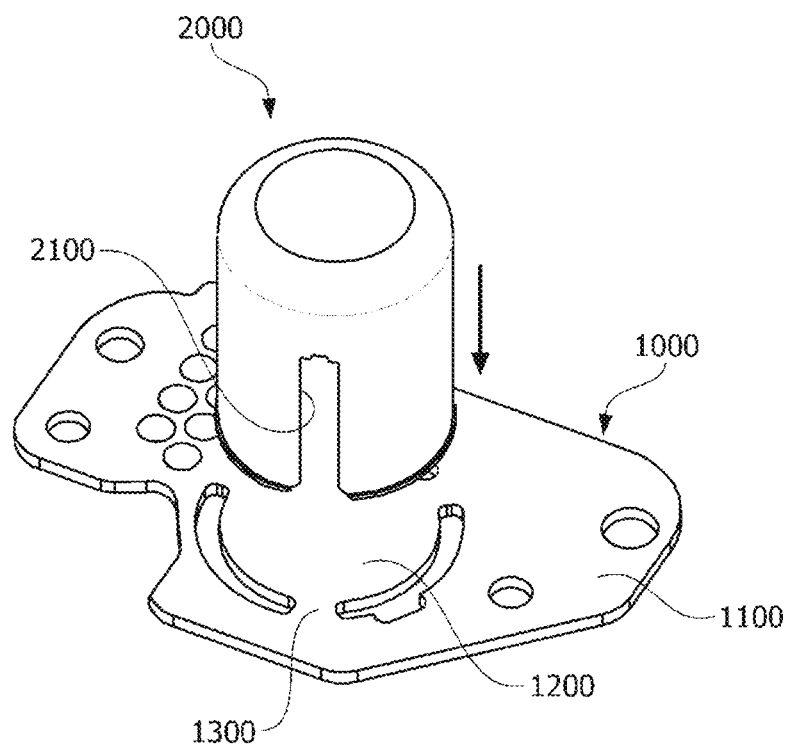
FIG. 12 is a view illustrating the cap member to be installed on the circuit substrate.

FIG. 12 is a view illustrating the cap member to be installed on the circuit substrate.

Referring to FIG. 12, the cap member 2000 may be installed on the circuit substrate 1000 to pass through the circuit substrate 1000 from an upper side to a lower side of the circuit substrate 1000. The cap member 2000 may be a cylindrical member in which the upper portion of the cap member 2000 is closed by an upper surface of the cap member 2000 and the lower portion of the cap member 2000 is open. Slots 2100 may be disposed in a side surface of the cap member 2000. The slots 2100 may be long and be disposed upward from a lower end of the cap member 2000 toward an upper end of the cap member 2000. The connecting portions 130 are inserted into the slots 2100. When the cap member 2000 passes through the circuit substrate 1000 and is installed on the circuit substrate 1000, the connecting portions 1300 are moved along the slots 2100. The number of the slots 2100 is equal to the number of the connecting portions 1300.

Figure 13:
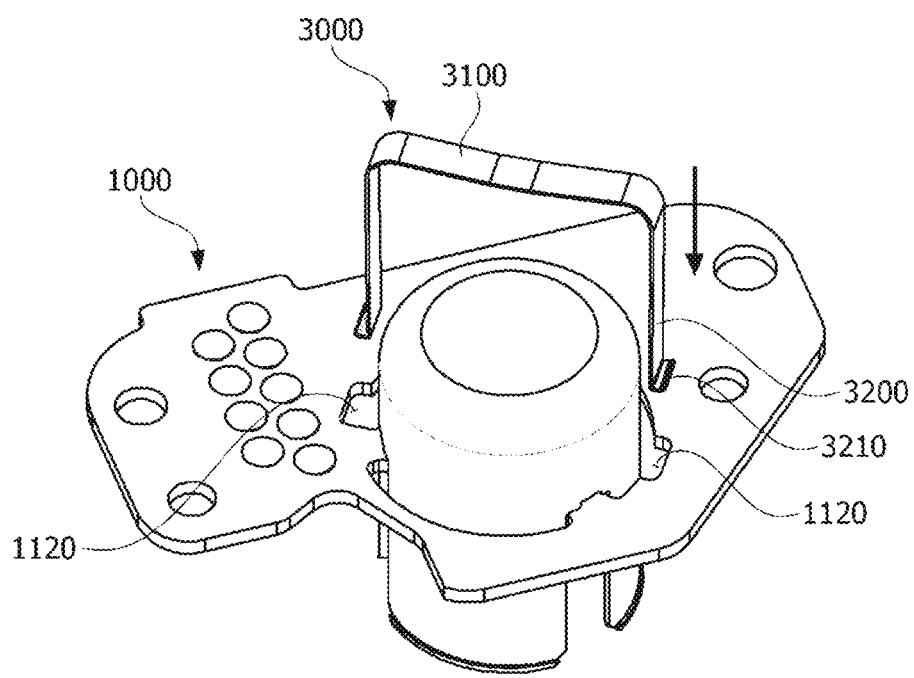
FIG. 13 is a view illustrating the fixing portion to be coupled to the circuit substrate.

FIG. 13 is a view illustrating the fixing portion to be coupled to the circuit substrate.

Referring to FIG. 13, the cap member 2000 is disposed to pass through the circuit substrate 1000 until upper ends of the slots 2100 touch the connecting portions 1300. In a state in which the cap member 2000 is installed on the circuit substrate 1000, the fixing portion 3000 may be disposed above the cap member 2000 and coupled to the circuit substrate 1000.

The fixing portion 3000 may include a body portion 3100 and leg portions 3200. The fixing portion 3000 may be a band type member. The body portion 3100 is in contact with the upper surface of the cap member 2000. The body portion 3100 elastically presses the upper surface of the cap member 2000 to fix the cap member 2000 to the circuit substrate 1000. The leg portions 3200 are inserted into the grooves 1120. Locking portions 3210 having a hook form may be disposed on lower ends of the leg portions 3200.

Figure 14:
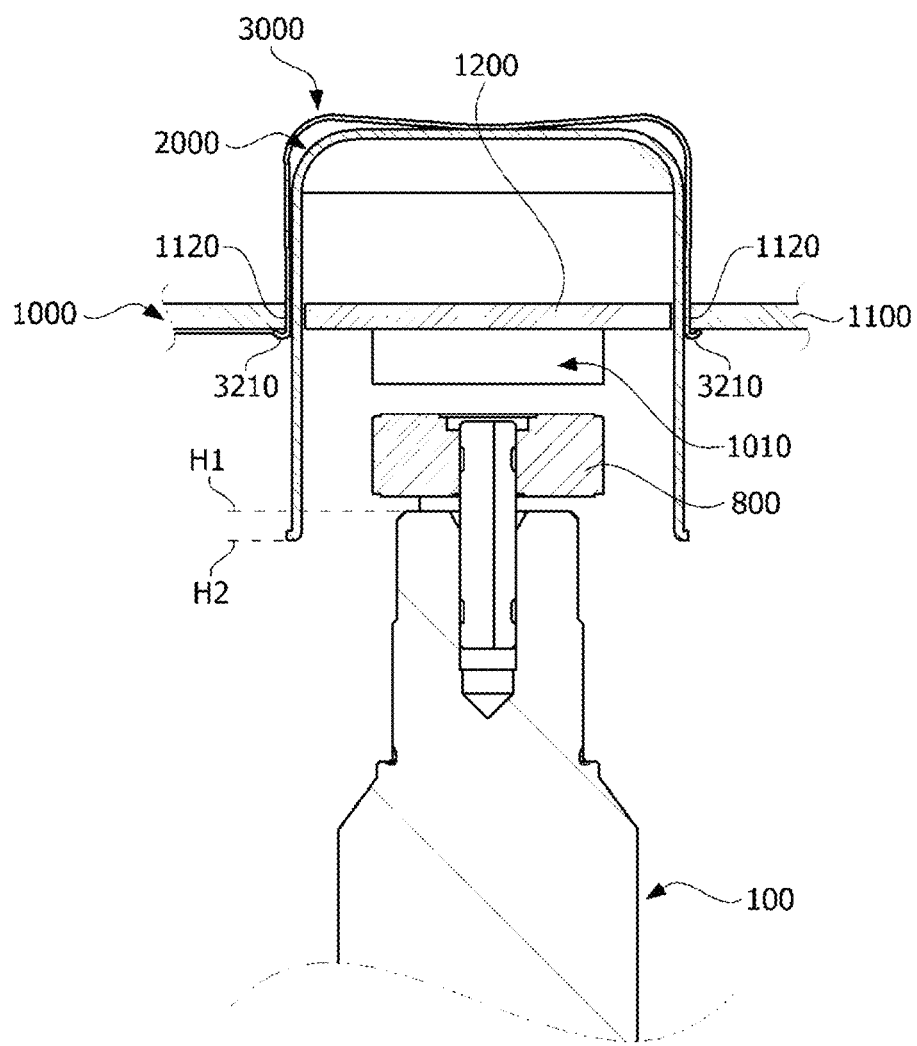
FIG. 14 is a side cross-sectional view illustrating a state in which the circuit substrate, the cap member, and the fixing portion are coupled.

FIG. 14 is a side cross-sectional view illustrating a state in which the circuit substrate, the cap member, and the fixing portion are coupled.

Referring to FIGS. 13 and 14, the circuit substrate 1000 is disposed above the sensing magnet 800. The sensor 1010 is disposed on a lower surface of the second substrate 1200 of the circuit substrate 1000. The sensor 1010 is disposed to face the sensing magnet 800. Hereinafter, the upper portion of the cap member 2000 is referred to as a part of the cap member 2000 positioned on the circuit substrate 1000 when the cap member 2000 is fixed to the circuit substrate 1000. In addition, the lower portion of the cap member 2000 is referred to as a part of the cap member 2000 positioned below the circuit substrate 1000 when the cap member 2000 is fixed to the circuit substrate 1000.

The upper portion of the cap member 2000 surrounds a space above the second substrate 1200. In addition, the lower portion of the cap member 2000 surrounds a space under the second substrate 1200 on which the sensor 1010 is mounted. Since the space above the second substrate 1200 is covered by the upper portion of the cap member 2000, electromagnetic waves applied to the sensor 1010 from an upper side of the second substrate 1200 may be blocked. In addition, since the space under the second substrate 1200 is surrounded by the lower portion of the cap member 2000, electromagnetic waves applied to the sensor 1010 from a lower side of the second substrate 1200 may be blocked.

In this case, a length of the lower portion of the cap member 2000 is determined such that a position H2 of the lower end of the cap member 2000 is disposed at a lower level than a position H1 of an upper end of the shaft 100 in a state in which the upper ends of the slots 2100 are blocked by the connecting portions 1300. Such a structure is to block the electromagnetic waves applied to the sensing magnet 800 disposed at the upper end of the shaft 100 and the sensor 1010 disposed above the sensing magnet 800.

Meanwhile, the locking portions 3210 of the leg portions 3200 inserted into the grooves 1120 are hooked to a lower surface of the first substrate 1100 to fix the fixing portion 3000 to the circuit substrate 1000 such that the fixing portion 3000 is not separated from the circuit substrate 1000.

Since the cap member 2000 may be assembled to the circuit substrate 1000 using the fixing portion 3000 with one-touch in a state in which the cap member 2000 is inserted into the circuit substrate 1000, there is an advantage in that an assembly process is very simple.

As described above, the motor according to the exemplary embodiments of the present invention has been described with reference to the accompanying drawings.

The above-described embodiments of the present invention should be considered in a descriptive sense only and not for purposes of limitation, and the scope of the present invention is defined not by the above-described detailed description but by the appended claims and encompasses all modifications or alterations derived from meanings and the scope of the appended claims, and equivalents thereof.

REFERENCE NUMERALS

100: SHAFT
200: ROTOR
300: STATOR
400: BUS BAR
500: HOUSING
600: FRONT COVER
700: REAR COVER
800: SENSING MAGNET
900: COVER
1000: CIRCUIT BOARD
2000: CAP MEMBER
3000: FIXING PORTION

The invention claimed is:

1. A motor comprising:
a shaft;
a rotor disposed outside the shaft;
a stator disposed outside the rotor;
a sensing magnet coupled to the rotor;
a circuit substrate disposed above the sensing magnet and including a sensor configured to detect a magnetic flux change due to the sensing magnet; and
a cap member that covers the sensor,
wherein the circuit substrate includes a first substrate, a second substrate disposed to be spaced apart from the first substrate, and connecting portions connecting the first substrate to the second substrate,
wherein the sensor is mounted on the second substrate,
wherein the cap member is disposed to pass through a separating space between the first substrate and the second substrate, an upper portion of the cap member surrounds a space above the second substrate, and a lower portion of the cap member surrounds a space under the second substrate, and
wherein the cap member is disposed such that a lowermost portion of the cap member is lower than an uppermost portion of the shaft, such that a shortest distance between the lowermost portion of the cap member and the circuit substrate is larger than a shortest distance between the uppermost portion of the shaft and the circuit substrate.

2. The motor of claim 1, wherein:
the first substrate includes a through hole; and
the second substrate is disposed inside the through hole.

3. The motor of claim 1, wherein:
slots formed upward from a lower end of the cap member are disposed in the cap member; and
the connecting portions are disposed in the slots.

4. The motor of claim 1, comprising a fixing portion that fixes the cap member to the circuit substrate,
wherein the fixing portion includes a body portion in contact with an upper surface of the cap member and leg portions disposed at both ends of the body portion and coupled to the circuit substrate.

5. The motor of claim 4, wherein the first substrate includes grooves recessed from the through hole toward an inner side of the first substrate, and
wherein the leg portions are disposed in the grooves.

6. A motor comprising:
a shaft:
a rotor disposed outside the shaft;
a stator disposed outside the rotor;
a sensing magnet coupled to the rotor;
a circuit substrate disposed above the sensing magnet and including a sensor configured to detect a magnetic flux change due to the sensing magnet;
a cap member that covers the sensor; and
a fixing portion that fixes the cap member to the circuit substrate,
wherein the circuit substrate includes a first substrate, a second substrate disposed to be spaced apart from the first substrate, and connecting portions connecting the first substrate to the second substrate,
wherein the sensor is mounted on the second substrate,
wherein the cap member is disposed to pass through a separating space between the first substrate and the second substrate, an upper portion of the cap member surrounds a space above the second substrate, and a lower portion of the cap member surrounds a space under the second substrate,
wherein the fixing portion includes a body portion in contact with an upper surface of the cap member and leg portions disposed at both ends of the body portion and coupled to the circuit substrate, wherein the first substrate includes a through hole, and wherein the second substrate is disposed inside the through hole.

7. The motor of claim 6, wherein:

the first substrate includes grooves recessed from the through hole toward an inner side of the first substrate; and the leg portions are disposed in the grooves.

8. The motor of claim 6, wherein slots formed upward from a lower end of the cap member are disposed in the cap member, and wherein the connecting portions are disposed in the slots.

* * * * *